(12) United States Patent
Tanaka (10) Patent No.: US 6,766,224 B2
(45) Date of Patent: Jul. 20, 2004

(54) INTEGRATED OPERATION INSTRUCTING SYSTEM FOR OPERATING POWER GENERATION PLANTS

(75) Inventor: Satoshi Tanaka, Hyogo-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 463 days.

(21) Appl. No.: 09/883,784

(22) Filed: Jun. 19, 2001

(65) Prior Publication Data

US 2002/0107614 A1 Aug. 8, 2002

(30) Foreign Application Priority Data

Jun. 21, 2000 (JP) ........................................ 2000-186648

(51) Int. Cl.[7] .............................................. G05D 17/00
(52) U.S. Cl. ........................ 700/287; 700/286; 702/188
(58) Field of Search ................................ 700/286–290; 702/34, 188; 290/40 R, 52; 60/773, 39.27, 39.281

(56) References Cited

U.S. PATENT DOCUMENTS 4,578,944 A    4/1986  Martens et al. .......... 60/39.182

6,556,956 B1 *  4/2003  Hunt ........................... 702/188

FOREIGN PATENT DOCUMENTS

DE    19614405 A1  * 10/1997
GB    2007926        5/1979

* cited by examiner

Primary Examiner—Leo Picard
Assistant Examiner—Steven R. Garland
(74) Attorney, Agent, or Firm—Wenderoth, Lind & Ponack, L.L.P.

(57) ABSTRACT

An integrated operation instructing system operates gas turbine power generation plants in a highly efficient and economical manner is provided. A gas turbine power generation plant $11n$ is controlled by a controller $11n1$ while operating status data of the gas turbine power generation plant $11n$ are collected by a data logger computer $11n3$, and transmitted to a central load dispatching instruction station 10 via the Internet 22. A computer 102 evaluates the deteriorating rate of the gas turbine based on the operating status data, and calculates an optimal target load taking the deteriorating rate into account. The optimal target load is transmitted via an exclusive telecommunication line $12n$ to the controller $11n1$, and the output of the gas turbine power generation plant $11n$ is controlled based on this optimal target load.

8 Claims, 8 Drawing Sheets

INTEGRATED OPERATION INSTRUCTING SYSTEM FOR OPERATING POWER GENERATION PLANTS

BACKGROUND OF THE INVENTION

1. Field of the Invention

The present invention relates to an integrated operation instructing system for power generation plants, and more particularly to an integrated operation instructing system; for operating power generation plants that is capable of operating gas turbine power generation plants in a highly efficient and economical manner.

2. Prior Art

Conventionally, in electric utilities, a central load dispatching instruction station calculates a load demand for each power generation plant and transmits it to each power generation plant via a telephone line or an exclusive telecommunication line. Each power generation plant receives the target load from the central load dispatching instruction station and controls the power output based on the target load.

In recent years, most power generation plants are gas turbine combined plants that have improved thermal efficiency. Since the efficiency of the compressor in a gas turbine plant is decreased significantly due to contamination accumulated on the compressor blades, the thermal efficiency of a gas turbine power generation plant unavoidably deteriorates over time.

Figure 1:
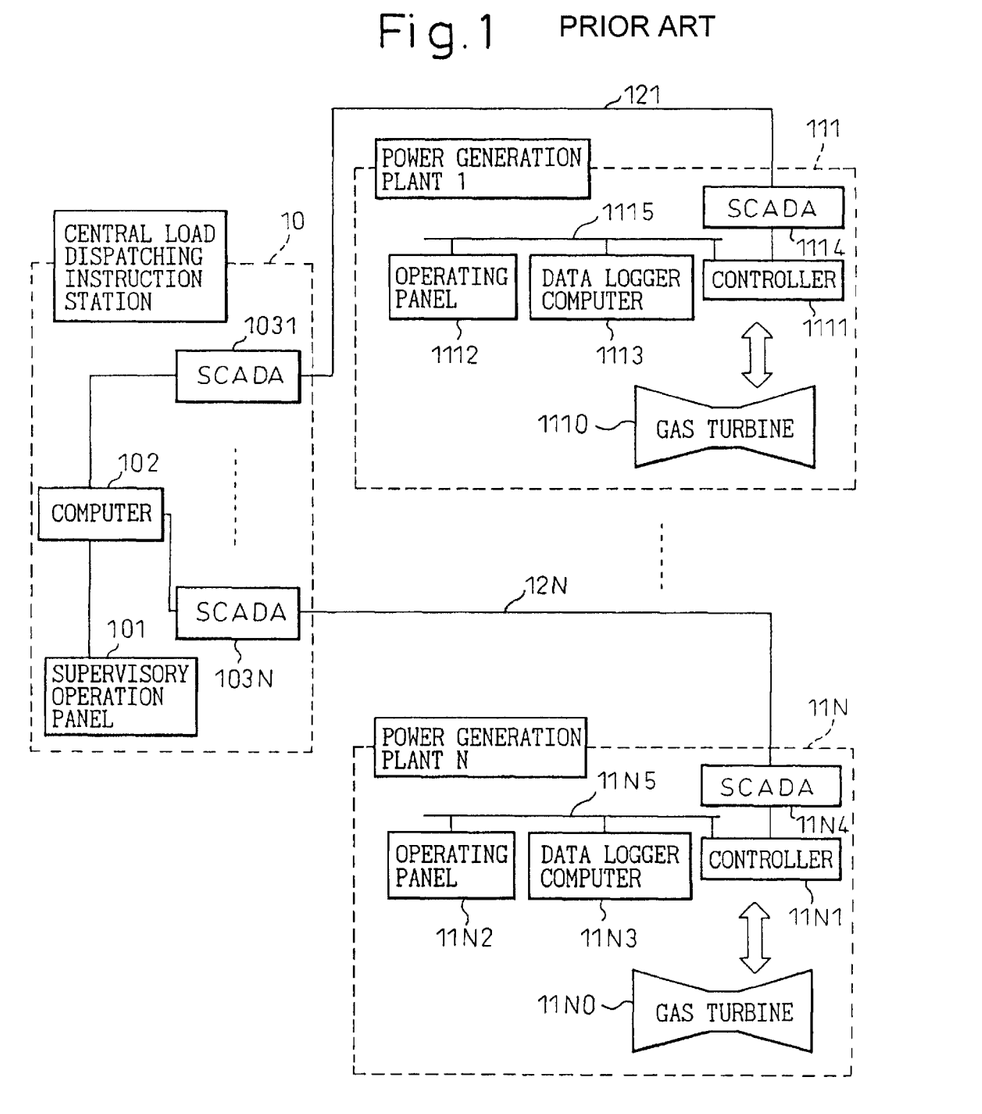
FIG. 1 is a diagram of a conventional integrated operation instructing system for operating power generation plants.

FIG. 1 is a view showing the construction of a conventional integrated power generation plant operation instructing system for operating gas turbine power generation plants. A central load dispatching instruction station 10 is connected to N gas turbine power generation plants 11*n* ($1 \leq n \leq N$) via exclusive telecommunication lines 12*n*.

The central load dispatching instruction station 10 is comprised of a supervisory operation panel 101 with which an operator operates and/or supervises the plants and a load dispatching instruction computer 102 which calculates a target load to be allocated to each of the power generation plants and which is connected via an interfaces (SCADA) 103*n* to the exclusive telecommunication lines 12*n*.

The gas turbine power generation plant 11*n* is comprised of a controller 11*n*1 for controlling a gas turbine power generator 11*n*0, an operating panel 11*n*2 for operating the gas turbine power generator 11*n*0, and a data logger computer 11*n*3 for collecting the operating status data of the gas turbine power generator 11*n*0. The controller 11*n*1 is connected via an interface (SCADA) 11*n*4 to the exclusive telecommunication line 12*n*. The controller 11*n*1, the operating panel 11*n*2 and the data logger computer 11*n*3 are connected to each other via a bus 11*n*5.

Thus, the target load for each gas turbine power generation plant calculated by the load dispatching instruction computer 102 is transmitted via the exclusive telecommunication line 12*n* to the controller 11*n*1 of the gas turbine power generation plant 11*n*, and each gas turbine power generator 11*n*0 is controlled based on the target load.

Output efficiency of a gas turbine power generator is influenced by the contamination of the compressor. Conventionally, however, in calculating the target load to each gas turbine power plant, the contamination of the compressor has not been taken into account. Thus, the cost of the power generation has not been considered in the calculation of the target load.

SUMMARY OF THE INVENTION

It is an object of the present invention to resolve the above-mentioned problem and to provide an integrated operation instructing system for power generation plants that is capable of operating gas turbine power generation plants in a highly efficient and economical manner.

According to a first aspect of the present invention, an integrated operation instructing system for power generation plants is comprised of a central load dispatching instruction station for instructing a target load to each of a plurality of gas turbine power generation plants; and a telecommunication line for connecting the plurality of gas turbine power generation plants to the central load dispatching instruction station. Each of the gas turbine power generation plants comprises gas turbine power generation plant control means for controlling the output of the gas turbine generator based on the target load instructed by the central load dispatching instruction station and operating status data transmitting means for transmitting the operating status data of the gas turbine power generation plant to the central load dispatching instruction station. The central load dispatching instruction station comprises deteriorating rate evaluating means for evaluating the deteriorating rate of the gas turbine based on the operational status data of the gas turbine power generation plant transmitted from the operational data transmitting means, optimal target load calculating means for calculating the optimal target load that minimizes total operating cost based on the deteriorating rate of the gas turbine calculated by the deteriorating rate evaluating means, and optimal target load output transmitting means for transmitting the optimal target load calculated by the optimal target load calculating means to the gas turbine power generation plant control means.

According to the first aspect of the present invention, the operational status data of the gas turbine power generation plant are transmitted to the central load dispatching instruction station, where the deteriorating rate of the gas turbine is evaluated. Then an optimal target load that minimizes the total operating cost, taking the deteriorating rate of the gas turbine into account, is set.

According to a second aspect of the present invention, the operating status data transmitting means transmit the data on the output of the gas turbine generator, the opening of the inlet guide vane, the pressure in the combustor cylinder, atmospheric temperature and a kind of fuel as the operating status data. The deteriorating rate evaluating means evaluates the deteriorating rate of the gas turbine based on the output of the gas turbine generator, the opening of the inlet guide vane, the pressure in the combustor cylinder, atmospheric temperature and the kind of fuel.

According to the second aspect of the invention, the deteriorating rate is corrected based on the output of the gas turbine generator, the opening of the inlet guide vane, the pressure in the combustor cylinder, atmospheric temperature and the kind of fuel.

According to a third aspect of the present invention, the operating status data transmitting means transmits the operating status data to the central load dispatching instruction station via the Internet. The optimal target load transmitting means transmits the optimal target load via exclusive telecommunication lines.

According to the third aspect of the invention, the optimal target load is transmitted via exclusive telecommunication lines; and the operating status data are transmitted via the Internet.

DETAILED DESCRIPTION OF THE PREFERRED EMBODIMENTS

Figure 2:
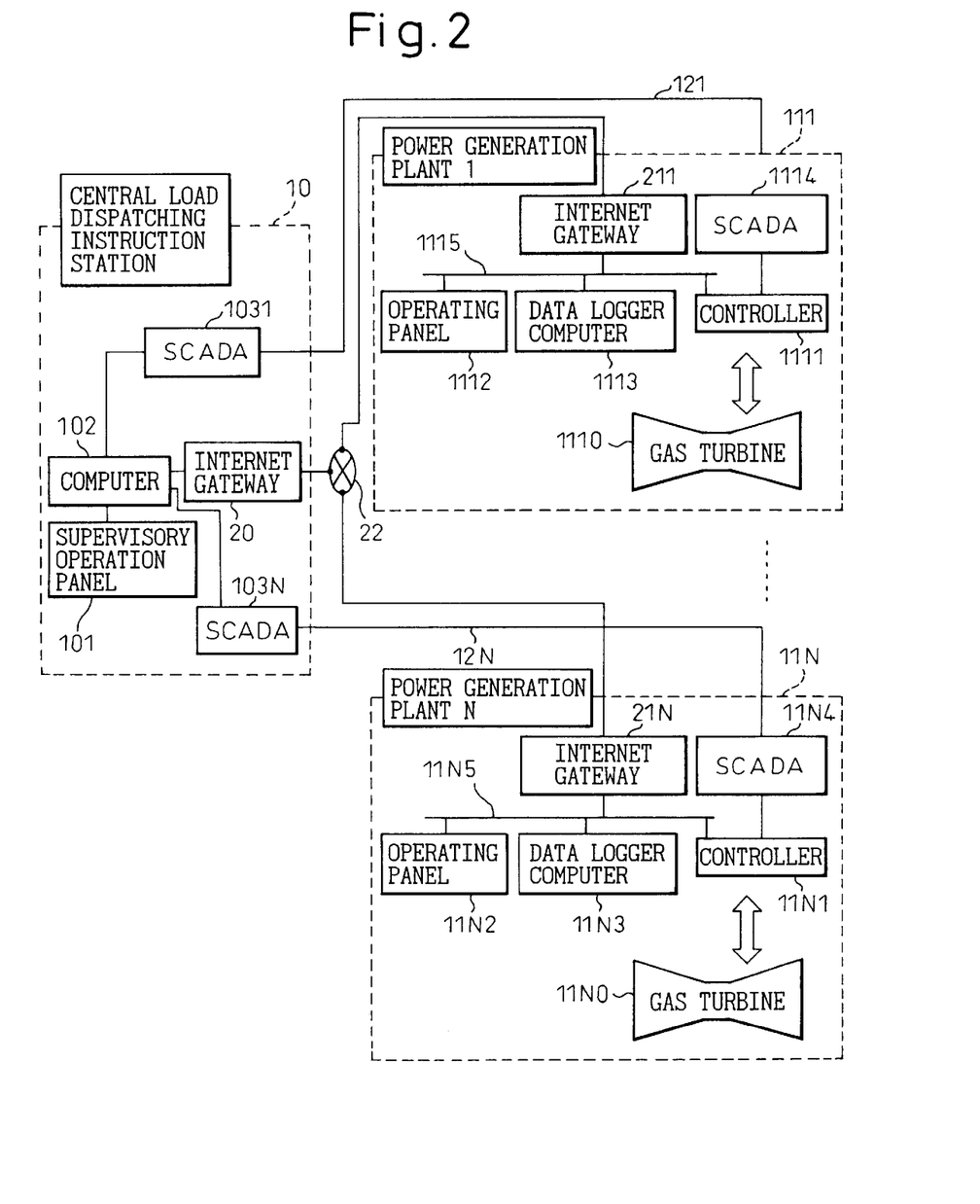
FIG. 2 is a diagram of an integrated operation instructing system for operating power generation plants according to the present invention.

FIG. 2 is a diagram of an integrated operation instructing system for operating power generation plants according to the present invention. In contrast to the conventional integrated operation instructing system for operating power generation plants, Internet gateway units 20 and 21$n$ (1≦n≦N) are additionally provided to the central load dispatching instruction station 10 and each of the gas turbine power generation plants 11$n$, and connected with each other via the Internet 22.

Thus, the central load dispatching instruction station 10 is comprised of a supervisory operation panel 101 supervised and operated by operators, and a load dispatching computer 102 for calculating the load to be dispatched to each of the power generation plants, and is connected to the Internet 22 via an Internet gateway unit 20 as well as to the exclusive telecommunication lines 12$n$ via interfaces (SCADA) 103$n$.

The gas turbine power generation plant 11$n$ is comprised of a controller 11$n$1 for controlling the gas turbine power generator 11$n$0, an operating panel 11$n$2 with which operators operate the gas turbine power generator 11$n$0, and a data logger computer 11$n$3 for collecting the operating status data of the gas turbine power generator 11$n$0, with the controller 11$n$1 being connected to the exclusive telecommunication line 12$n$ via an interface (SCADA) 11$n$4. The controller 11$n$1, the operating panel 11$n$2 and the data logger computer 11$n$3 are connected to with each other via a bus 11$n$5. Further, the bus 11$n$5 is connected to the Internet 22 via an Internet gateway unit 21$n$.

The same reference numerals are used throughout the drawings to denote the same construction elements as in the conventional integrated operation instructing system for operating power generation plants.

Figure 3:
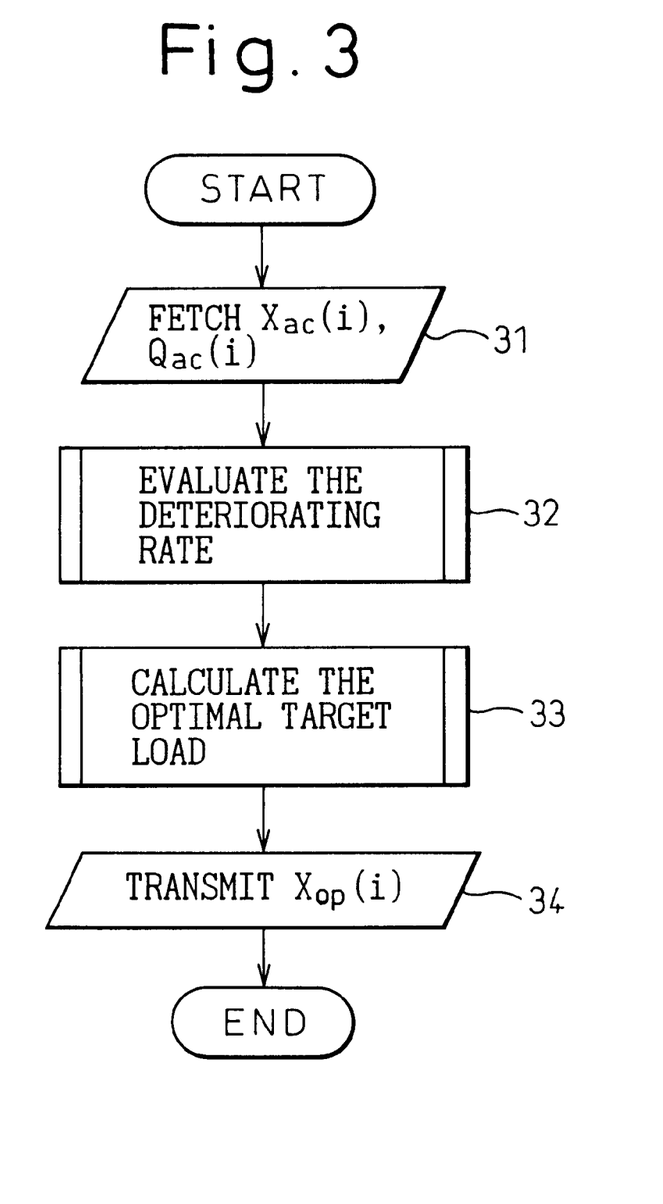
FIG. 3 is a flow chart of the load dispatching routine.

FIG. 3 is a flow chart of the load dispatching routine executed by the load dispatching instruction computer 102 every predetermined time interval (for example, every 3 minutes).

At step 31, actual generated power $X_{ac}(n)$(1≦n≦N) [MW/h] and fuel flow rate $Q_{ac}(n)$ [KNm$^3$/h] of each gas turbine generator are fetched via SCADA 11$n$4 on the side of the power generation plant, the exclusive telecommunication line 12$n$ and SCADA 103$n$ on the side of the central load dispatching instruction station.

Then, at step 32, the gas turbine deteriorating rate DR(n) is evaluated, and the optimal target load $X_{op}(n)$ is calculated at step 33.

Finally, the optimal target load $X_{op}(n)$ is transmitted to each gas turbine power generation plant 11$n$ via SCADA 103$n$ at the central load dispatching instruction station, the exclusive telecommunication line 12$n$ and SCADA 11$n$4 at the power generation plant, and this routine is terminated.

Figure 4:
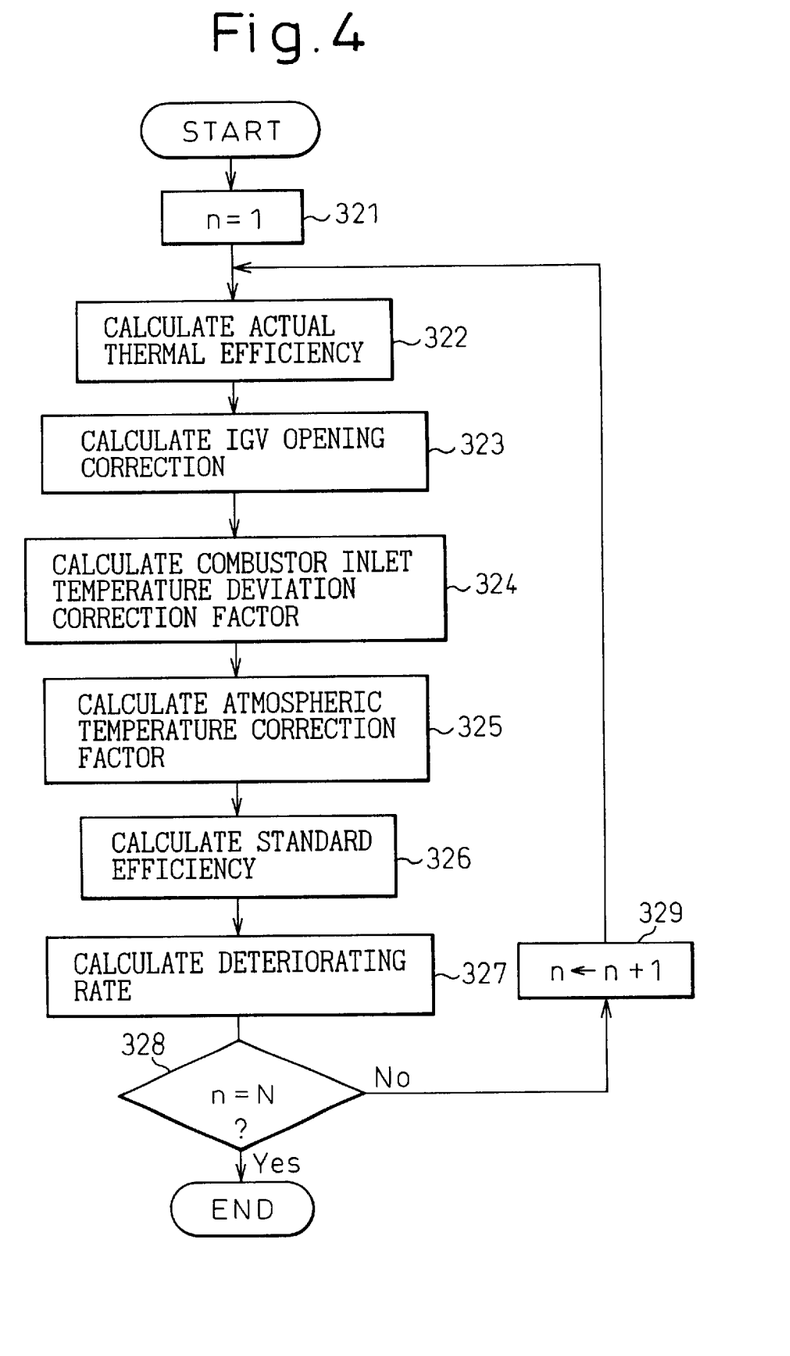
FIG. 4 is a flow chart of the deteriorating rate evaluating routine.

FIG. 4 is a flow chart of the gas turbine deteriorating rate evaluating routine to be executed at step 32. At step 321, the index n indicating the gas turbine power generation plant number is set to the initial value "1".

At step 322, actual thermal efficiency GTEU(n) of the gas turbine is computed based on (1):

$$GTEU(n) = \frac{\alpha \cdot X_{ac}(n)}{\beta \cdot Q_{ac}(n)} \quad (1)$$

α: Heat equivalent of mechanical work[MJ/MW]
β: Calorific value per unit volume of fuel[MJ/KNm$^3$]

At step 323, the correction factor EUIGV(n) due to the opening of IGV (inlet guide vane) is calculated based on (2):

$$EUIGV(n)=EIGV\{IGVO(n)\} \quad (2)$$

Figure 5:
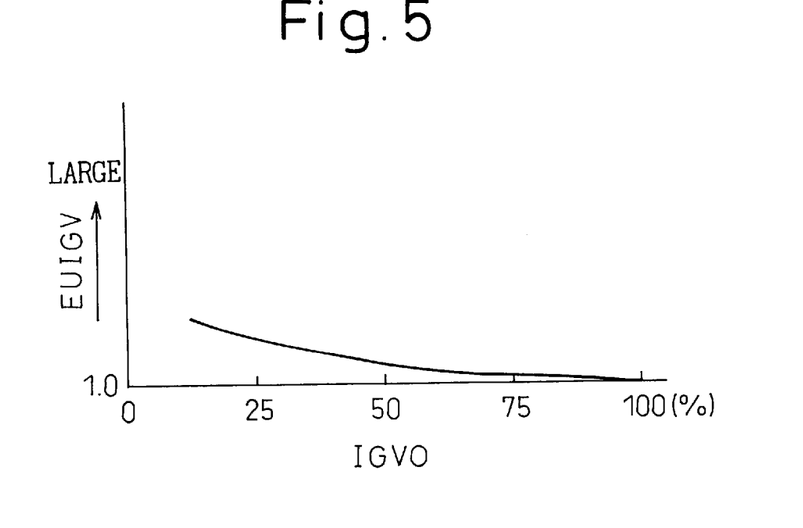
FIG. 5 is a graph of the IGV opening correction coefficient function.

IGVO(n): opening of IGV of the gas turbine n
EIGV{·}: IGV opening correction factor function:

FIG. 5 is a graph showing the IGV opening correction coefficient function with the IGV opening IGVO as an independent variable. IGV opening IGVO is indicated on the abscissa, and the correction coefficient EUIGV is indicated on the ordinate.

Next, the correction factor for the combustor inlet temperature deviation correction factor EUTIT(n) is calculated at step 324.

At step 325, the atmospheric temperature correction factor EUAT(n) is calculated based on (3):

$$EUAT(n)=EUTA\{AT(n)\} \quad (3)$$

Figure 6:
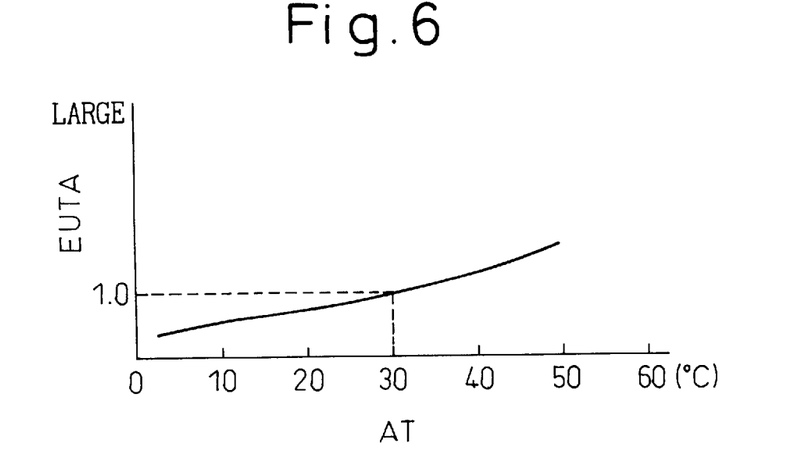
FIG. 6 is a graph of the atmospheric temperature correction coefficient function.

AT(n): atmospheric temperature around the gas turbine n;
EUTA{·}: atmospheric temperature correction factor function FIG. 6 is a graph of the atmospheric temperature correction factor function with atmospheric temperature AT as an independent variable. Atmospheric temperature AT is indicated on the abscissa, and the atmospheric temperature correction coefficient EUAT is indicated on the ordinate.

Then, at step 326, the standard efficiency CGTEU(n), which is the operating efficiency at the standard atmospheric temperature and at the standard combustor inlet temperature, is calculated based on (4):

$$CGTEU(n)=GTEU(n) \cdot EUIGV(n) \cdot EUTIT(n) \cdot EUTA(n) \cdot EOIL(n) \quad (4)$$

EOIL(n): correction factor of oil burning:

Finally, at step 327, deteriorating rate DR(n) of the gas turbine n is calculated based on (5):

$$DR(n)=CGTEU(n)/PGTEU(n) \quad (5)$$

PGTEU(n): design reference efficiency of the gas turbine n

At step 328, it is determined whether or not the calculation of the deteriorating rate has been finished for all the gas turbines. If it has not been finished for all the gas turbines, the index n is incremented by one at step 329, and the control returns to step 322. If computation has been finished for all the gas turbines, this routine is terminated.

Figure 7:
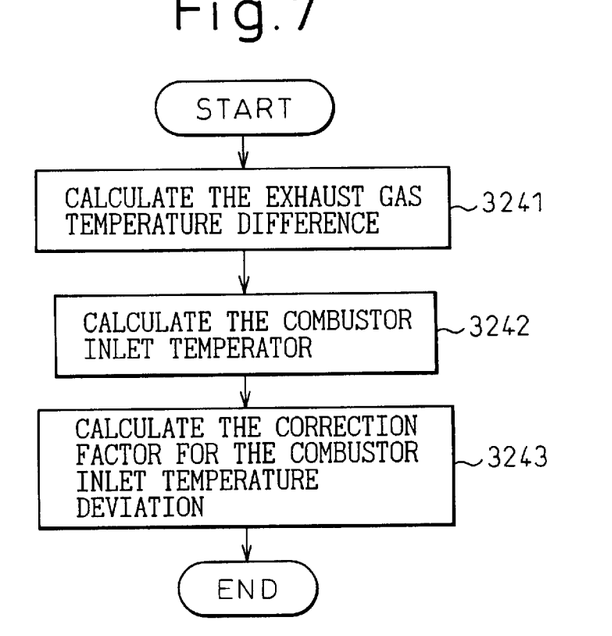
FIG. 7 is a flow chart of the combustor inlet temperature deviation correction coefficient computing routine.

FIG. 7 is a flow chart of the atmospheric temperature correction factor calculating routine to be executed at step 324. At step 3241, the temperature difference DEFTEX(n) of exhaust gas from the combustor inlet standard temperature is calculated based on (6):

$$DEFTEX(n) = DETEX\{PCS(n)\} - T2T(n) \quad (6)$$

Figure 8:
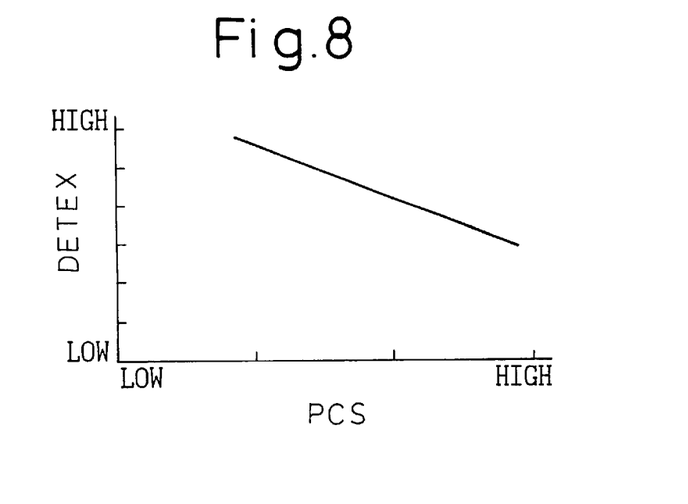
FIG. 8 is a graph of the exhaust gas temperature function.

PCS(n): pressure of the combustor cylinder
DETEX{·}: exhaust gas temperature function
T2T(n): measured exhaust gas temperature FIG. 8 is a graph showing the exhaust gas temperature function with the pressure of the combustor cylinder as an independent variable. The pressure of combustor cylinder PCS is indicated on the abscissa, and the exhaust gas temperature is indicated on the ordinate.

At step 3242, the combustor inlet temperature CTIT(n) as a function of the temperature difference DEFTEX(n) of exhaust gas is calculated based on (7):

$$CTIT(n) = STIT - DEFTEX(n) \cdot CFAC \quad (7)$$

STIT: standard combustor inlet temperature (a constant)
CFAC: correction factor (a constant)

Finally, at step 3243, the correction factor EUTIT(n) for the combustor inlet temperature deviation is calculated as a function of the combustor inlet temperature CTIT(n) based on (8), and then this routine is terminated:

$$EUTIT(n) = ETIT\{CTIT(n)\} \quad (8)$$

ETIT{·}: correction coefficient function for the combustor inlet temperature deviation.

Figure 9:
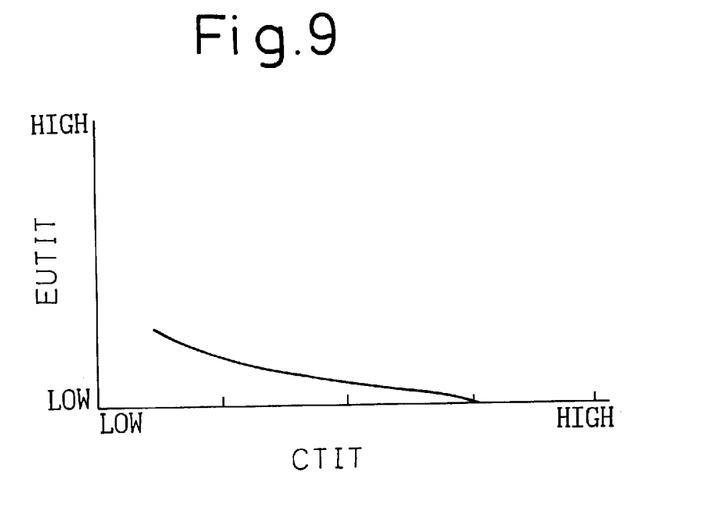
FIG. 9 is a graph of the correction coefficient function to correct for the deviation of the combustor inlet temperature.

FIG. 9 is a graph of the correction factor function with the combustor inlet temperature CTIT(n) as an independent variable. The combustor inlet temperature CTIT is indicated on the abscissa, and the correction coefficient EUTIT for the deviation of the combustor inlet temperature is indicated on the ordinate.

Status variables of the gas turbine which are utilized in the deteriorating rate evaluating routine are as follows,
IGVO(n): IGV opening
AT(n): atmospheric temperature
PCS(n): pressure of the combustor cylinder
T2T(n): exhaust gas temperature They are measured every relatively long time interval (eg., every one hour) and transmitted to the central load dispatching instruction station 10 via the Internet gateway unit 21n at the power generation plant, the telecommunication line 22 and the Internet gateway unit 20 at the central load dispatching instruction station.

Figure 10:
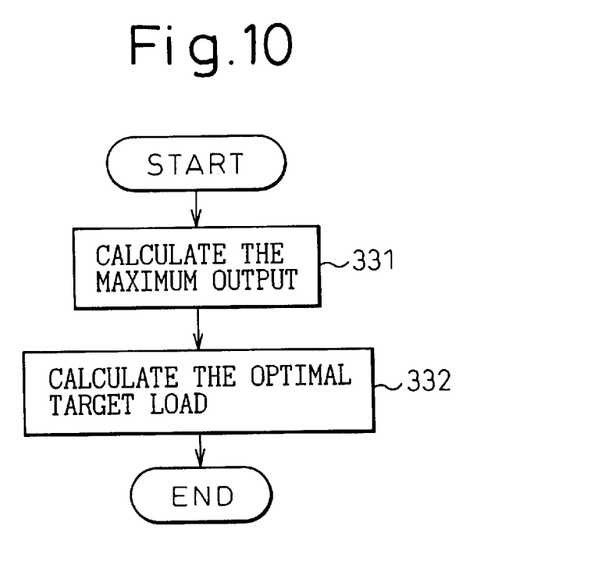
FIG. 10 is a flow chart of the optimal target load calculating routine.

FIG. 10 is a flow chart of the optimal target load calculating routine to be executed at step 33 of the load dispatching routine. At step 331, a feasible maximum power output XMX(n) of each gas turbine is calculated based on (9):

$$X_{MX}(n) = X_{MX}\{AT(n)\} \cdot DR(n) \quad (9)$$

$X_{MX}\{\cdot\}$: feasible maximum power output function
Feasible maximum power output function $X_{MX}\{\cdot\}$ is given as design data with atmospheric temperature as an independent variable.

Next, at step 332, the optimal target load $X_{op}(n)$ of each gas turbine is determined so as to minimize the operating cost C as given by (11) under the restriction given by (10):

$$O \leq X_{op}(n) \leq X_{MX}(n) \quad (10)$$

$$L = \sum_{n=1}^{N} X_{op}(n)$$

L: total target load $$C = \sum_{n=1}^{N} CST\{X_{op}(n), AT(n), DR(n)\}$$

$$= \sum_{n=1}^{N} \gamma \cdot HR\{X_{op}(n), AT(n)\} \cdot X_{op}(n)$$

HR{·, ·}: heat rate function
γ: price of fuel per unit volume

A well-known method such as a linear programming method or the like can be used as a computation technique for determining the optimal target load so as to minimize the operational cost C.

Figure 11:
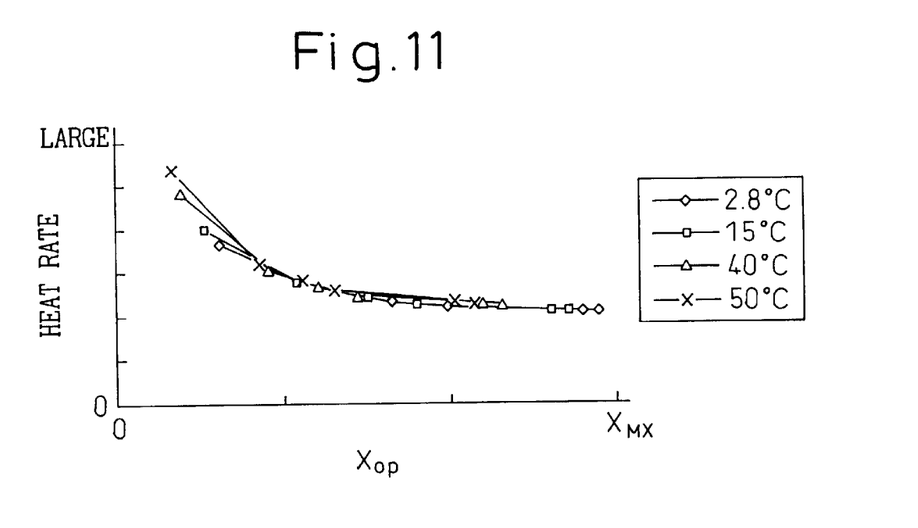
FIG. 11 is a graph of the heat rate function.

FIG. 11 is a graph of the heat rate function with the gas turbine output $X_{op}$ and atmospheric temperature AT as independent variables. The gas turbine output $X_{op}$ is indicated on the abscissa, and heat rate is indicated on the ordinate, with atmospheric temperature AT as a parameter.

When gas is used as the fuel of the gas turbine, the gas combustion heat rate function is used. On the other hand, when oil is used as the fuel, the oil combustion heat rate function should be used.

With the integrated operation instructing system according to the first invention, it is possible to calculate the deteriorating rate of the gas turbine based on the operating status data of the gas turbine power generation plant, and to determine the optimal target load so as to minimize the operating cost, taking into account the deteriorating rate.

With the integrated operation instructing system according to the second invention, it is possible to properly correct for the deteriorating rate.

With the integrated operation instructing system according to the third invention, the operational status data utilized in the calculation of the deteriorating rate are transmitted via the Internet so that it is possible to avoid its influence on the transmission of the optimal target load via an exclusive telecommunication line.

I claim:

1. An integrated operation instructing system for operating power generation plants which remotely instructs, from a central load dispatching instruction station, each of a plurality of gas turbine power generation plants their respective target load, said system comprising:
   an instruction station data processor at said central load dispatching instruction station;
   power generation plant data processors at respective ones of the gas turbine power generation plants; and
   communication lines for connecting said instruction station data processor with said power generation plant data processors, wherein said instruction station data processor comprises:
   deteriorating rate evaluating means for evaluating deteriorating rate of gas turbines based on operating status data of the gas turbine power generation plants;
   optimal target load calculating means for calculating an optimal target load so as to minimize total operating cost taking the deteriorating rate evaluated by said deteriorating rate evaluating means into account; and optimal target load transmitting means for transmitting the optimal target load calculated by said optimal target load calculating means to said power generation plant data processors;

wherein said deteriorating rate evaluating means evaluates the deteriorating rate of gas turbines based on gas turbine power generator output, inlet guide vane opening, combustor cylinder pressure, atmospheric temperature and kind of fuel.

2. An integrated operation instructing system for operating power generation plants which remotely instructs, from a central load dispatching instruction station, each of a plurality of gas turbine power generation plants their respective target load, said system comprising:

an instruction station data processor at said central load dispatching instruction station;

power generation plant data processors at respective ones of the gas turbine power generation plants; and communication lines for connecting said instruction station data processor with said power generation plant data processors, wherein said power generation plant data processors comprise:

power generation plant control means for controlling output of gas turbine power generators at the target load instructed by said central load dispatching instruction station; and operating status data transmitting means for transmitting operating status data of the gas turbine power generation plants to said instruction station data processor, wherein the operating status data transmitting means transmits gas turbine power generator output, inlet guide vane opening, combustor cylinder pressure, atmospheric temperature and kind of fuel as operating status data.

3. An instruction station data processor comprising:

deteriorating rate evaluating means for evaluating deteriorating rate of gas turbines based on operating status data of gas turbine power generation plants;

optimal target load calculating means for calculating an optimal target load so as to minimize total operating cost taking the deteriorating rate evaluated by said deteriorating rate evaluating means into account; and optimal target load transmitting means for transmitting the optimal target load calculated by said optimal target load calculating means to power generation plant data processors;

wherein said deteriorating rate evaluating means evaluates the deteriorating rate of gas turbines based on gas turbine power generator output, inlet guide vane opening, combustor cylinder pressure, atmospheric temperature and kind of fuel.

4. A power generation plant data processor comprising:

power generation plant control means for controlling output of a gas turbine power generator at a target load instructed by a central load dispatching instruction station; and operating status data transmitting means for transmitting operating status data of the gas turbine power generator to the instruction station, wherein said operating status data transmitting means transmits gas turbine power generator output, inlet guide vane opening, combustor cylinder pressure, atmospheric temperature and kind of fuel as operational status data.

5. A communication system transmitting operating status data from power generation plant data processors to an instruction station data processor using the Internet, said instruction station data processor comprising:

deteriorating rate evaluating means for evaluating deteriorating rate of gas turbines based on operating status data of gas turbine power generation plants transmitted over the Internet;

optimal target load calculating means for calculating an optimal target load so as to minimize total operating cost taking the deteriorating rate evaluated by said deteriorating rate evaluating means into account; and optimal target load transmitting means for transmitting the optimal target load calculated by said optimal target load calculating means to said power generation plant data processors;

wherein said deteriorating rate evaluating means evaluates the deteriorating rate of gas turbines based on gas turbine power generator output, inlet guide vane opening, combustor cylinder pressure, atmospheric temperature and kind of fuel.

6. A communication system transmitting an optimal target load from an instruction station data processor to power generation plant data processors using exclusive telecommunication lines, said instruction station data processor comprising:

deteriorating rate evaluating means for evaluating deteriorating rate of gas turbines based on operating status data of gas turbine power generation plants;

optimal target load calculating means for calculating the optimal target load so as to minimize total operating cost taking the deteriorating rate evaluated by said deteriorating rate evaluating means into account; and optimal target load transmitting means for transmitting the optimal target load calculated by said optimal target load calculating means to said power generation plant data processors;

wherein said deteriorating rate evaluating means evaluates the deteriorating rate of gas turbines based on gas turbine power generator output, inlet guide vane opening, combustor cylinder pressure, atmospheric temperature and kind of fuel.

7. A communication system transmitting operating status data from power generation plant data processors to an instruction station data processor using the Internet, said power generation plant data processor comprising:

power generation plant control means for controlling output of a gas turbine power generator at a target load instructed by a central load dispatching instruction station; and operating status data transmitting means for transmitting the operating status data of the gas turbine power generator to said instruction station data processor, wherein said operating status data transmitting means transmits gas turbine power generator output, inlet guide vane opening, combustor cylinder pressure, atmospheric temperature and kind of fuel as operational status data.

8. A communication system transmitting an optimal target load from an instruction station data processor to power generation plant data processors using exclusive telecommunication lines, said power generation plant data processors comprising:

power generation plant control means for controlling output of a gas turbine power generator at the target load instructed by said instruction station data processor; and     operating status data transmitting means for transmitting operating status data of the gas turbine power generator to said instruction station data processor, wherein said operating status data transmitting means transmits gas turbine power generator output, inlet guide vane opening, combustor cylinder pressure, atmospheric temperature and kind of fuel as operational status data.

* * * * *